United States Patent
Skraparlis et al.

(10) Patent No.: US 9,736,244 B2
(45) Date of Patent: Aug. 15, 2017

(54) PEER REVIVAL DETECTION

(71) Applicant: NOKIA SOLUTIONS AND NETWORKS OY, Espoo (FI)

(72) Inventors: Dimitrios Skraparlis, Athens (GR); Konstantinos Kondylis, Galatsi (GR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 174 days.

(21) Appl. No.: 14/434,920

(22) PCT Filed: Oct. 10, 2012

(86) PCT No.: PCT/EP2012/069983
§ 371 (c)(1),
(2) Date: Apr. 10, 2015

(87) PCT Pub. No.: WO2014/056528
PCT Pub. Date: Apr. 17, 2014

(65) Prior Publication Data
US 2015/0288765 A1    Oct. 8, 2015

(51) Int. Cl.
*G06F 15/16* (2006.01)
*G06F 15/173* (2006.01)
(Continued)

(52) U.S. Cl.
CPC ........ *H04L 67/141* (2013.01); *H04L 12/4641* (2013.01); *H04L 12/6418* (2013.01);
(Continued)

(58) Field of Classification Search
CPC ............... H04L 67/141; H04L 12/4641; H04L 12/6418; H04L 67/104; H04L 67/142; H04L 67/145; H04L 69/40; H04L 63/164
(Continued)

(56) References Cited

U.S. PATENT DOCUMENTS 7,836,497 B2 * 11/2010 Hossain ................ H04L 45/586
726/1
7,848,338 B2    12/2010 Bachmutsky
(Continued)

FOREIGN PATENT DOCUMENTS

EP    2 109 275 A1    10/2009

OTHER PUBLICATIONS

3GPP TS 23.234 V10.0.0 (Mar. 2011), Technical Specification, 3rd Generation Partnership Project; Technical Specification Group Services and System Aspects; 3GPP system to Wireless Local Area Network (WLAN) interworking; System description (Release 10), Mar. 2011, 84 pages.
(Continued)

*Primary Examiner* — Melvin H Pollack
(74) *Attorney, Agent, or Firm* — Squire Patton Boggs (US) LLP

(57) ABSTRACT

It is provided a method, comprising detecting a request for establishing a session between a peer and a network, wherein the request is received from the peer and comprises an identifier of a user of the network; checking, if the request is detected, whether a first session is established, wherein the first session is a session of the user which is established between the peer and the network; determining, if it is checked that the first session is established, whether the first session is dead or alive; flushing the first session if it is determined that the first session is dead; triggering an establishment of the requested session if it is determined that the first session is dead.

19 Claims, 11 Drawing Sheets

(51) Int. Cl.
  *H04L 29/08* (2006.01)
  *H04L 12/46* (2006.01)
  *H04L 12/64* (2006.01)
  *H04L 29/14* (2006.01)
  *H04L 29/06* (2006.01)

(52) U.S. Cl.
  CPC .......... *H04L 67/104* (2013.01); *H04L 67/142* (2013.01); *H04L 67/145* (2013.01); *H04L 69/40* (2013.01); *H04L 63/164* (2013.01)

(58) Field of Classification Search
  USPC ...................................................... 709/228
  See application file for complete search history.

(56) References Cited

U.S. PATENT DOCUMENTS

| | | | | |
|---|---|---|---|---|
| 7,933,253 | B2* | 4/2011 | Akram | H04L 12/4641 370/331 |
| 7,987,506 | B1* | 7/2011 | Khalid | H04L 12/4633 370/401 |
| 8,037,530 | B1* | 10/2011 | Fink | H04L 9/0841 713/153 |
| 8,050,218 | B2* | 11/2011 | Morishige | H04W 68/12 370/328 |
| 8,078,727 | B2* | 12/2011 | Hanson | H04L 41/0893 709/226 |
| 8,086,845 | B2* | 12/2011 | Jain | H04L 63/029 713/151 |
| 8,091,126 | B2* | 1/2012 | Swander | H04L 63/1408 726/15 |
| 8,104,081 | B2* | 1/2012 | Khanna | H04L 12/4641 370/331 |
| 8,141,126 | B2* | 3/2012 | Gearhart | H04L 63/164 714/15 |
| 8,180,375 | B2* | 5/2012 | Awad | H04M 3/2227 455/414.1 |
| 8,296,839 | B2* | 10/2012 | Sax | H04L 12/4679 713/153 |
| 8,316,113 | B2* | 11/2012 | Linden | G06F 11/181 709/220 |
| 8,352,603 | B2* | 1/2013 | Akil Ponnuswamy | H04L 63/08 707/927 |
| 8,397,288 | B2* | 3/2013 | Melvin, Jr. | H04L 63/164 370/252 |
| 8,432,825 | B2* | 4/2013 | Balasaygun | G06F 9/543 370/252 |
| 8,443,087 | B2* | 5/2013 | Kamboh | H04L 12/2856 370/466 |
| 8,458,248 | B2* | 6/2013 | Son | H04L 61/1511 709/203 |
| 8,458,344 | B2* | 6/2013 | Li | H04L 12/4633 709/224 |
| 8,458,786 | B1* | 6/2013 | Kailash | H04L 63/0272 709/220 |
| 8,462,952 | B2* | 6/2013 | Hoover | H04L 41/28 380/270 |
| 8,548,171 | B2* | 10/2013 | McGrew | H04L 9/0833 380/259 |
| 8,589,541 | B2* | 11/2013 | Raleigh | H04L 41/0893 455/405 |
| 8,656,481 | B2* | 2/2014 | Cheng | H04L 63/164 713/151 |
| 8,724,517 | B1* | 5/2014 | Bulusu | H04L 45/48 370/254 |
| 8,837,491 | B2* | 9/2014 | Huynh Van | H04L 9/30 370/395.31 |
| 8,881,305 | B2* | 11/2014 | Salomone | H04L 9/321 713/168 |
| 8,964,695 | B2* | 2/2015 | Bachmann | H04L 63/164 370/331 |
| 9,426,029 | B2* | 8/2016 | Saavedra | H04L 41/0816 |
| 2008/0172582 | A1 | 7/2008 | Sinicrope et al. | |
| 2010/0306572 | A1* | 12/2010 | Salvarani | H04L 63/164 714/4.1 |
| 2011/0066858 | A1 | 3/2011 | Cheng et al. | |
| 2012/0096269 | A1* | 4/2012 | McAlister | H04L 63/061 713/171 |

OTHER PUBLICATIONS

Vesselin Tzvetkov, "Optimization of update intervals in Dead-Peer-Detection using adaptive Fuzzy Logic," Advanced Information Networking and Applications, 2007 (AINA '07), 21st International Conference, IEEE, pp. 266-273; May 21-23, 2007.
R. Braden, "Requirements for Internet Hosts—Communication Layers," Network Working Group, RFC 1122, Internet Engineering Task Force (IETF), Oct. 1989, 116 pages.
D. Harkins et al., "The Internet Key Exchange (IKE)," Network Working Group, RFC 2409, Internet Engineering Task Force (IETF), Nov. 1998, 36 pages.
G. Huang et al., "A Traffic-Based Method of Detecting Dead Internet Key Exchange (IKE) Peers," Network Working Group, RFC 3706, Internet Engineering Task Force (IETF), Feb. 2004, 13 pages.
S. Kent et al., "Security Architecture for the Internet Protocol," Network Working Group, RFC 4301, Internet Engineering Task Force (IETF), Dec. 2005, 101 pages.
C. Kaufman et al., "Internet Key Exchange Protocol Version 2 (IKEv2)," Network Working Group, RFC 5996, Internet Engineering Task Force (IETF), Sep. 2010, 138 pages.
Yixin Diao et al., "Using MIMO Feedback Control to Enforce Policies for Interrelated Metrics with Application to the Apache Web Server," Network Operations and Management Symposium, NOMS, IEEE 2002, pp. 219-234.
IlJin Lee et al., "A Study on Keepalive Mechanism between Sip Ua and Proxy server for Internet Telephony Service," The 9th International Conference on Advanced Communication Technology; pp. 1115-1118; Feb. 12-14, 2007.
Yang Hyeon et al., "Battery Life Time Extension Method by Using Signalling Interval Control," 14th International Conference on Advanced Communication Technology (ICACT); pp. 327-330; Feb. 19-22, 2012.
Director of Central Intelligence, Directive 6/3, "Protecting Sensitive Compartmented Information within Information Systems," May 2000, 47 pages.
DOD 5220.22-M; National Industrial Security Program Operating Manual (NISPOM), Feb. 28, 2006, 141 pages.
Vesselin Tzvetkov, "Fast detection of disconnection using adaptive Fuzzy Logic," Networking, sensing and Control, 2007, IEEE International Conference; pp. 828-833, Apr. 15-17, 2007.
Vesselin Tzvetkov, "Optimization of mobile updates using Particle filter," Communications and Networking in China 2008, ChinaCom 2008; Third International Conference; pp. 915-920; Aug. 25-27, 2008.
International Search Report and Written Opinion dated Jun. 6, 2013 corresponding to International Patent Application No. PCT/EP2012/069983.
Y. Nir et al., "A Quick Crash Detection Method for the Internet Key Exchange Protocol (IKE)," Internet Engineering Task Force (IETF), RFC 6290, Jun. 22, 2011, pp. 1-22, XP015076046.
Y. Sheffer et al., "Internet Key Exchange Protocol Version 2 (IKEv2) Session Resumption," Internet Engineering Task Force (IETF), RFC 5723, Jan. 7, 2010, pp. 1-26, XP015068135.

* cited by examiner

PEER REVIVAL DETECTION

FIELD OF THE INVENTION

The present invention relates to an apparatus, a method, a system, and a computer program product related to dead peer detection. More particularly, the present invention relates to an apparatus, a method, a system, and a computer program product for peer revival detection.

BACKGROUND OF THE INVENTION

Abbreviations

3GPP: 3rd Generation Partnership Project
AAA: Authentication, Authorization and Accounting
BFD: Bidirectional Forwarding Detection
CPU: Central Processing Unit
DNS: Domain Name Server
DPD: Dead Peer Detection
ePDG: Evolved Packet Data Gateway
ESP: Encapsulating Security Payload
GGSN: Gateway GPRS Support Node
GPRS: General Packet Radio Service
GSM: Global System for Mobile Communication
GTP: GPRS Tunneling Protocol
HLR: Home Location Register
HSxPA: High Speed Packet Access (x: Downlink/Uplink)
IDi: Initiator Identity
IKE: Internet Key Exchange
IP: Internet Protocol
IPsec: Internet Protocol security
LTE: Long Term Evolution
NAT: Network Address Translation
PDG: Packet Data Gateway
RFC: Request For Comments (Internet Engineering Task Force)
Rx: Receive
SA: Security Association
SAD: Security Association Database
SIP: Session Initiation Protocol
SNS: Social Networking Service
SPD: Security Policy Database
SPI: Security Parameter Index
TCP: Transmission Control Protocol
TTG: Tunneling Termination Gateway
Tx: Transmit
UMTS: Universal Mobile telecommunication System
VPN: Virtual Private Network
WiFi: Wireless Fidelity Standard
WLAN: Wireless Local Area Network
WiMAX: Worldwide interoperability for Microwave Access The provision of secure communications over insecure networks has become one of the key drivers for the success of modern applications which require data source authentication, encryption and data integrity. IP Security (IPsec) [RFC4301] is a popular suite of protocols that offers the means for building secure Virtual Private Networks (VPNs). IPsec is accompanied by key management methods between source (initiator) and destination (responder) such as Internet Key Exchange (IKE). The IKE protocol can currently be found as two versions in modern applications, version 1 (IKEv1, specified in [RFC2409]) and version 2 (IKEv2, specified in [RFC5996]).

When two peers communicate with IKE and IPSec, connectivity between the two peers might go down unexpectedly. This situation arises whenever there is an outage in network connectivity. For example, a fading event in a wireless link or a routing problem or an incomplete roaming procedure will result in unavailability of connectivity between the two peers. In such cases, it might happen that one of the two involved peers does not detect the outage event and keeps believing that the connection to the other peer is still "alive"; In such cases the peer is actually retaining a dead connection which wastes internal resources (such as memory and processing power). If this case is extrapolated to "live" environments with thousands of nodes (e.g. acting as VPN clients), retaining connection associations to undetected dead peers can impose significant strain to the network resources and can have a huge impact in the system capacity, throughput and quality of service.

This problem is very important in systems containing mobile devices since the wireless link is inherently unstable due to fading events caused by shadowing, multipath propagation, user mobility etc.

To solve such problems, Dead-Peer-Detection (DPD) algorithms [RFC3706, RFC5996] have been proposed which attempt to recognize dead peers as soon as possible and recover lost resources to the network elements.

The present application refers to any system which deploys virtual private networks such as IPsec/IKE solutions with dead peer detection extensions (see FIG. 1). For example, the application applies to security gateway elements (which function as VPN servers).

As a more specific example, the application may be applied (but is not limited) to the design of Tunneling Termination Gateways (TTG) and Packet Data Gateways (PDG) in WLAN Interworking systems which either abide or are adaptations of 3GPP standards (such as [3GPP23.234]), as described in the next sections. An example of such a system is given in FIG. 2 which shows Nokia Siemens Network's Smart WLAN Connectivity Solution.

FIG. 3 illustrates a typical message flow diagram for the case of a system consisting of a VPN client and a VPN server which facilitates the client's connection to the internet or any services.

Establishment of secure connection begins with IKE negotiations, the details of which are outside the scope of this application.

Each user is authenticated by using a unique identity, known as Initiator Identity (IDi—[RFC2409, RFC5996]). The unique identity is referenced throughout this application as IDi; please note that this unique identity might be termed differently depending on the application.

Each peer issues periodic liveliness checks of the other peer in the form of Dead Peer Detection (DPD—sometimes termed as "peer liveliness detection") messages. If the peer receives a DPD response within a specific timeout interval or observes any other activity from the other peer such as traffic or signalling, then the peer is considered as "alive" and DPD liveliness check is rescheduled to occur after $t_{DPD}$ seconds. The rescheduling interval can either be fixed (e.g. $t_{DPD}$=90 seconds) or dynamic according to any algorithm (e.g. depending on estimations of the outage probability such as the mechanism proposed in [Tzvetkov07a, Tzvetktov07b, Tzvetkov08]).

In the case of a peer going offline without properly informing the other peer (e.g. radio outage or network failure in general), as shown in FIG. 3, the peer is initially unaware of the other "dead" peer. The peer then observes that the first DPD message is not replied by the other peer, since a timeout occurs. In that case the peer begins n retransmissions (e.g. n=7) of the DPD message with either a fixed interval $d_{DPD}$ or an adaptive one ($d_{DPD}(i)$ where i=1 . . . n). As an example, the interval for retransmission iteration i can take the form:

$$d_{DPD}(i)=c*b^{\wedge}(i-1)$$

where i=1, 2, . . . n, c and b are constants that can be chosen either adaptively or predefined depending on the application scenario (e.g. c=4, b=1.8).

After n retransmissions where the "dead" peer still does not reply, the peer sets a final timeout of $d_{DPD(giveup)}$ which, once expired, completes the evidence that the other peer is indeed "dead" and that the session must be released, thus freeing-up system resources from the peer (e.g. the VPN server). Similarly to the previously issued timeout intervals, $d_{DPD(giveup)}$ can take either take a dynamic value or a constant value (e.g. $d_{DPD(giveup)}=c*b^{\wedge}n$, c=4, b=1.8).

The total time taken by the DPD procedure to properly detect a dead peer is given by $d_{DPD\_TOTAL}$ which is equal to the sum of all timeouts of the DPD messages sent by the peer. For example, if $d_{DPD}(i)$ is set to a constant a for all retransmissions i=1, 2, . . . , n and also equal to $d_{DPD(giveup)}$, then $d_{DPD\_TOTAL}=(n+1)*a$.

The above description is an example of Dead Peer Detection which illustrates the concept.

However, in cases of mobility or realistic propagation conditions as encountered by mobile terminals, this typical DPD behavior of the VPN Server can cause problems, as described hereinafter.

FIG. 4 illustrates the problem of the "forced outage" where the VPN client goes offline ("dies") for a short period.

Referring to FIG. 4, in this case the VPN server is assumed to follow a policy of allowing only one active session per IDi. This policy is found in many practical systems where implementation complexity and resource utilization at the server side is by design kept to a minimum.

Using the DPD procedure, as described in the previous paragraphs, a VPN server is able to detect a "dead" peer.

However, if the "dead" peer is revived before the DPD procedure is completed, then the new IKE negotiation will be refused by the VPN server. This is because the revived peer will initiate a new IKE session (i.e. with new identification parameters such as SPI [RFC2409, RFC5906]). The revived peer will then enter a "forced outage" period until the DPD procedure completes and must retry to connect after this DPD procedure is finished.

In practical systems, this "forced outage" period can be in the order of several minutes or hours depending on the policy, which results in very low availability and quality of service metrics, which in turn has a severe impact on user experience. Furthermore, depending on the time of the peer's revival relative the initiation of the DPD procedure on the previous session instance, the time period for which the peer is required to wait until the DPD procedure completes appears as random to the user. In most practical cases, since the cause of this "forced outage" problem is not evident to a user of a mobile device, the user will typically attempt several manual reconnections which will be refused until reconnected (if reattempting to connect after the "forced outage" period) or give up. Thus in a live environment, it is expected that thousands of users will be attempting several reconnections during the "forced outage" periods of several minutes, which would in turn increase the signaling traffic (having direct impact on the system capacity) and will also cause the observation of very low quality of service from all users as well as high service unavailability.

From a system designer's point of view, it is possible to affect the period of "forced outages" by properly configuring the DPD procedure on the VPN server. In general, it may be desirable to set a low DPD timer, low DPD retransmission timers and low number of retransmissions, which would lead to lower "forced outage" intervals but at the expense of highly increased (more frequent) signaling and associated lower system capacities as well as higher probability of false detections. Moreover, a policy of having a balanced configuration which would trade-off timely discovery of dead peers and low probability of false detection, as recommended by [RFC6290: Appendix A.4], would not address the "forced outage" problem which is experienced by thousands of peers in practical live environments.

Multiple Sessions Per IDi

One of the methods used to address the "forced outage" problem in practical systems is allowing multiple sessions per IDi [Cisco2012].

Referring to FIG. 5, consider the case where a peer establishes a VPN connection but afterwards "dies" for a short period. The dead peer is detected using a DPD procedure such as the one described in the previous paragraphs. As soon as the peer is revived, it attempts a reconnection which is automatically accepted. The reconnection is accepted even though the request is originating from the same device and user. At this point, an individual peer has already reserved double the amount of resources (e.g. memory and processing power reserved for managing security associations) at the server. If the peer again "dies" for a short period, is again revived and attempts another reconnection then a new (third) session will be established.

Thus, in the case of a server allowing multiple sessions per IDi, "dead" sessions are detected using DPD detection. However, the DPD procedure can be very slow in practical configurations, as has been described above. Moreover, in a system allowing multiple sessions with the same IDi, it is possible that the rate of reconnections of a single peer (going "dead" and reviving shortly thereafter) is much faster than the rate of "dead peer" detections and resource releases at the VPN server side. In that case a single peer will consume resources on the VPN server (e.g. database memory) at a rate higher than the rate of detecting and freeing-up of previously allocated resources to it's own "dead" instances. In other words, allowing multiple sessions per IDi can lead to a very fast growth in resource consumption throughout the system.

This problem is fundamental in practical systems where peers are mobile devices which, due to a constantly changing propagation environment, come into and out of outage several times per minute. For example, a mobile peer in a vehicular environment entering and exiting WiFi areas with sufficient radio coverage (signal power) will come into and out of outage several times per minute. Thus, by extrapolating such cases to a live mobile environment with thousands of users, it is evident that the resource consumption due to the multiple sessions per IDi at the VPN server side can be increased even by an order of magnitude compared to the case where only a single session per IDi is allowed.

Moreover, limiting the amount of maximum multiple sessions per IDi to a specific number, above which further connections would be refused would provide a trade-off between resource consumption at the VPN server and limiting of the "forced outage" problem. However, such an approach would not actually address the fundamental problems described above and is impractical in real scenarios where multiple outages of a mobile peer would be observed within a single minute, the number of which is random and difficult to predict.

Furthermore, from a security point of view, the multiple sessions per IDi solution can pose significant vulnerability risks to any systems such as the ones considered in this invention. In major regulatory efforts such as [NISPOM06: Sections 8-602b and 8-609b] and [DCID00] it is required to restrict simultaneous sessions per user.

Forced Session Replacement

Another alternative method implemented in actual systems which attempts to address the "forced outage" problem is forcing session replacement [Cisco2012].

Referring to FIG. 6, a reviving peer would attempt to reconnect with the same IDi. This case would be detected by the VPN server and the previous session allocated to this IDi would be replaced by the new one (e.g. the previous session would be flushed or the previous session would be forced to log off and a new session would be created). While this approach does indeed successfully address the "forced outage" problem, it cannot handle cases where multiple legitimate peers can have the same IDi (e.g. username). This situation can arise in business cases where e.g. a telecommunications operator allows its customers to securely access (via VPN) the internet/services on numerous devices simultaneously by using the same IDi and settings.

In general there are numerous use cases where multiple sessions from multiple terminals using the same IDi is desired, cases which the session replacement procedure fails to address. Furthermore, there exist use cases which require that a single device can establish multiple sessions to the same end-point (e.g. VPN server) using the same IDi; such cases are not addressed by the session replacement procedure, either.

Furthermore, forced session replacement is problematic in cases where a user's IDi is leaked to an attacker, where the attacker constantly replaces legitimate sessions with bogus ones and succeeds in degrading overall service availability.

In [Cheng11] a different problem to the one tackled by this application is addressed in which the IKE and IPSec can become unsynchronized and it is proposed to introduce multiple lifetime mechanisms in IKE/IPSec. However, the proposed invention in [Cheng11] addresses a different problem (compared to the "forced outage" problem) in which the DPD mechanism is successful but nevertheless fails to detect the synchronization error (e.g. IPSec Security Association is abnormally released while the IKE Security Association is unaffected).

In [Sinicrope08] a system architecture different to the one studied in the current application is considered which consists of two fixed peers (e.g. routers or UNIX servers which support the Bidirectional Forwarding Detection protocol) with the requirement to keep track of peer liveliness in real-time (e.g. sub-second intervals). [Sinicrope08] proposes to replace the DPD mechanism by utilizing the Bidirectional Forwarding Detection (BFD) protocol. [Sinicrope08] does not address the general problem of "forced outage" in a mobile network. Moreover, the mechanism proposed in [Sinicrope08] is not practically applicable to mobile networks consisting of thousands of resource-constrained mobile peers since firstly, BFD is not a protocol typically implemented in mobile devices, and secondly, it is not possible to achieve sub-second liveliness checks in such mobile systems (due to capacity limitations and increased probability of false liveliness detections).

In [Bachmutsky10] a high availability scenario regarding gateways in a mobile network is proposed where secondary (backup) gateways are kept informed of the peer liveliness.

In [Morishige11] the interworking of a paging mechanism and a dead peer detection mechanism is proposed in a system where a mobile terminal has numerous connections to a network using several different wireless interfaces (e.g. WiFi, WiMAX etc.).

REFERENCES

[3GPP23234] "3GPP system to Wireless Local Area Network (WLAN) interworking; System description," Technical Specification Group Services and System Aspects, 3rd Generation Partnership Project, 3GPP TS 23.234 V10.0.0 (2011-03).

[Bachmutsky10] Bachmutsky, A., Network-based reliability of mobility gateways, U.S. Pat. No. 7,848,338, 2010.

[Cheng11] Cheng, H., Agozo, F. K. and Lin, J., System and method for IPSec link configuration, United States Patent Application, Pub. No. 2011/0066858 A1, 2011.

[Cisco2012] Cisco ASA 5500 Series Configuration Guide using the CLI, 8.4 and 8.6, Cisco ASA 5500 Series Adaptive Security Appliance documentation, Cisco Systems Inc., 2012, [available online at: http://www.cisco.com/en/US/docs/security/asa/asa84/configuration/guide/asa_84_cli_config.html]

[DCID00] "Protecting Sensitive Compartmented Information Within Information Systems," Directive 6/3 (DCID 6/3), Director of Central Intelligence, May 2000.

[Diao02] Yixin Diao; Gandhi, N.; Hellerstein, J. L.; Parekh, S.; Tilbury, D. M.; "Using MIMO feedback control to enforce policies for interrelated metrics with application to the Apache Web server," Network Operations and Management Symposium, 2002. NOMS 2002. 2002 IEEE/IFIP, vol., no., pp. 219-234, 2002.

[Hyeon12] Yang Hyeon; Min Woo Kim; Jong Min Lee; Seong Gon Choi; "Battery life time extension method by using signalling interval control," Advanced Communication Technology (ICACT), 2012 14th International Conference on, pp. 327-330, 19-22 Feb. 2012.

[Lee07] IlJin Lee; Jae Cheon Han; Wook Hyun; ShinGak Kang; "A Study on Keepalive Mechanism between SIP UA and Proxy server for Internet Telephony Service," Advanced Communication Technology, The 9th International Conference on, vol. 2, pp. 1115-1118, 12-14 Feb. 2007.

[Morishige11] Morishige, T. and Takatsuki, M., Mobile communications system PDIF and method for peer detection of mobile terminal, U.S. Pat. No. 8,050,218, 2011.

[NISPOM06] National Industrial Security Program Operating Manual (NISPOM), DoD 5220.22-M, February 2006.

[RFC1122] Braden, R., "Requirements for Internet Hosts—Communication Layers", RFC1122, Internet Engineering Task Force (IETF), October 1989.

[RFC2409] Harkins, D. and D. Carrel, "The Internet Key Exchange (IKE)", RFC 2409, Internet Engineering Task Force (IETF), November 1998.

[RFC3706] Huang, G., Bealieu, S. and Rochefort, D., "A Traffic-Based Method of Detecting Dead Internet Key Exchange (IKE) Peers," RFC 3706, Internet Engineering Task Force (IETF), February 2004.

[RFC4301] Kent, S. and Seo, K., "Security Architecture for the Internet Protocol," RFC 4301, Internet Engineering Task Force (IETF), December 2005.

[RFC5996] Kaufman, C., Hoffman, P., Nir, Y. And Eronen, P., "Internet Key Exchange (IKEv2) Protocol," RFC 5996, Internet Engineering Task Force (IETF), September 2010.

[Sinicrope08] Sincrope, D. and Comen, J., Method and system for providing peer liveliness for high speed environments, United States Patent Application, Pub. No. US 2008/0172582 A1, 2008.

[Tzvetkov07a] Tzvetkov, V., "Optimization of update intervals in Dead-Peer-Detection using adaptive Fuzzy Logic," Advanced Information Networking and Applications, 2007. AINA '07. 21st International Conference on, pp. 266-273, 21-23 May 2007.

[Tzvetkov07b] Tzvetkov, V., "Fast detection of disconnection using adaptive Fuzzy Logic," Networking, Sensing and Control, 2007 IEEE International Conference on, pp. 828-833, 15-17 Apr. 2007.

[Tzvetkov08] Tzvetkov, V., "Optimization of mobile updates using Particle filter," Communications and Networking in China, 2008. ChinaCom 2008. Third International Conference on, pp. 915-920, 25-27 Aug. 2008.

SUMMARY OF THE INVENTION

It is an object of the present invention to improve the prior art.

According to a first aspect of the invention, there is provided an apparatus, comprising detecting means adapted to detect a request for establishing a session between a peer and a network, wherein the request is received from the peer and comprises an identifier of a user of the network; checking means adapted to check, if the request is detected, whether a first session is established, wherein the first session is a session of the user which is established between the peer and the network; determining means adapted to determine, if it is checked that the first session is established, whether the first session is dead or alive; flushing means adapted to flush the first session if it is determined that the first session is dead; triggering means adapted to trigger an establishment of the requested session if it is determined that the first session is dead.

The apparatus may further comprise counting means adapted to count a number of established sessions of the user to the network; inhibiting means adapted to inhibit the determining means to determine whether the first session is dead or alive if the number of the established sessions of the user is less than a maximum number.

In the apparatus, the maximum number may be 1.

In the apparatus, the maximum number may be larger than 1, and the determining means may be adapted to determine for at least one of all the established sessions of the user to the network whether the respective session is dead or alive; the flushing means may be adapted to flush at least one session of the user which is determined being dead.

In the apparatus, the determining means may be adapted to determine for all of the established sessions of the user to the network whether the respective session is dead or alive.

In the apparatus, the flushing means may be adapted to flush each session of the user which is determined being dead.

In the apparatus, the determining means may be adapted to determine for at least two of all the established sessions of the user to the network whether the respective session is dead or alive; and the apparatus may further comprise prohibiting means adapted to prohibit, after the determining means had determined that one of all the established sessions is dead, the determining means from determining whether any of all the established sessions of the user is dead or alive for which it has not been determined before it was determined for the one of all the established sessions.

The apparatus may further comprise session liveliness detection means adapted to perform a normal session liveliness detection if a transmission from the peer in the first session is not received in order to determine whether the first session is dead or alive; wherein the determining means may be adapted to determine whether the first session is dead or alive by a boosted session liveliness detection faster than the normal session liveliness detection.

In the apparatus, the peer may be a mobile device.

In the apparatus, the network may be a virtual private network.

According to a second aspect of the invention, there is provided an apparatus, comprising detecting processor adapted to detect a request for establishing a session between a peer and a network, wherein the request is received from the peer and comprises an identifier of a user of the network; checking processor adapted to check, if the request is detected, whether a first session is established, wherein the first session is a session of the user which is established between the peer and the network; determining processor adapted to determine, if it is checked that the first session is established, whether the first session is dead or alive; flushing processor adapted to flush the first session if it is determined that the first session is dead; triggering processor adapted to trigger an establishment of the requested session if it is determined that the first session is dead.

The apparatus may further comprise counting processor adapted to count a number of established sessions of the user to the network; inhibiting processor adapted to inhibit the determining processor to determine whether the first session is dead or alive if the number of the established sessions of the user is less than a maximum number.

In the apparatus, the maximum number may be 1.

In the apparatus, the maximum number may be larger than 1, and the determining processor may be adapted to determine for at least one of all the established sessions of the user to the network whether the respective session is dead or alive; the flushing processor may be adapted to flush at least one session of the user which is determined being dead.

In the apparatus, the determining processor may be adapted to determine for all of the established sessions of the user to the network whether the respective session is dead or alive.

In the apparatus, the flushing processor may be adapted to flush each session of the user which is determined being dead.

In the apparatus, the determining processor may be adapted to determine for at least two of all the established sessions of the user to the network whether the respective session is dead or alive; and the apparatus may further comprise prohibiting processor adapted to prohibit, after the determining processor had determined that one of all the established sessions is dead, the determining processor from determining whether any of all the established sessions of the user is dead or alive for which it has not been determined before it was determined for the one of all the established sessions.

The apparatus may further comprise session liveliness detection processor adapted to perform a normal session liveliness detection if a transmission from the peer in the first session is not received in order to determine whether the first session is dead or alive; wherein the determining processor may be adapted to determine whether the first session is dead or alive by a boosted session liveliness detection faster than the normal session liveliness detection.

In the apparatus, the peer may be a mobile device.

In the apparatus, the network may be a virtual private network.

According to a third aspect of the invention, there is provided a method, comprising detecting a request for establishing a session between a peer and a network, wherein the request is received from the peer and comprises an identifier of a user of the network; checking, if the request is detected, whether a first session is established, wherein the first session is a session of the user which is established between the peer and the network; determining, if it is checked that the first session is established, whether the first session is dead or alive; flushing the first session if it is determined that the first session is dead; triggering an establishment of the requested session if it is determined that the first session is dead.

The method may be a method of peer revival detection.

The method may further comprise counting a number of established sessions of the user to the network; inhibiting the determining whether the first session is dead or alive if the number of the established sessions of the user is less than a maximum number.

In the method, the maximum number may be 1.

In the method, the maximum number may be larger than 1, and the determining may be adapted to determine for at least one of all the established sessions of the user to the network whether the respective session is dead or alive; the flushing may be adapted to flush at least one session of the user which is determined being dead.

In the method, the determining may be adapted to determine for all of the established sessions of the user to the network whether the respective session is dead or alive.

In the method, the flushing may be adapted to flush each session of the user which is determined being dead.

In the method, the determining may be adapted to determine for at least two of all the established sessions of the user to the network whether the respective session is dead or alive; and the method may further comprise prohibiting, after it is determined that one of all the established sessions is dead, the determining whether any of all the established sessions of the user is dead or alive for which it has not been determined before it was determined for the one of all the established sessions.

The method may further comprise performing a normal session liveliness detection if a transmission from the peer in the first session is not received in order to determine whether the first session is dead or alive; wherein the determining may be adapted to determine whether the first session is dead or alive by a boosted session liveliness detection faster than the normal session liveliness detection.

In the method, the peer may be a mobile device.

In the method, the network may be a virtual private network.

According to a fourth aspect of the invention, there is provided a computer program product comprising a set of instructions which, when executed on an apparatus, is configured to cause the apparatus to carry out the method according to the third aspect.

The computer program product may be embodied as a computer-readable medium.

According to embodiments of the invention, at least the following advantages are achieved:

Reliable session management is enabled by detecting which peers are attempting to reconnect and which peers request new connections. Thus resource management such as CPU load, memory, signaling etc is optimized. By applying the revival detection mechanism of embodiments of the invention to systems allowing multiple sessions per IDi, the number of multiple sessions per IDi is minimized (no duplicate sessions for the same user compared to prior art). On the other hand, this invention covers use cases where forced session replacement is not suitable.

User experience is improved because the "forced outage" period is shortened.

The solution is backwards compatible. In particular, no modifications of the terminal are required.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Figure 1:
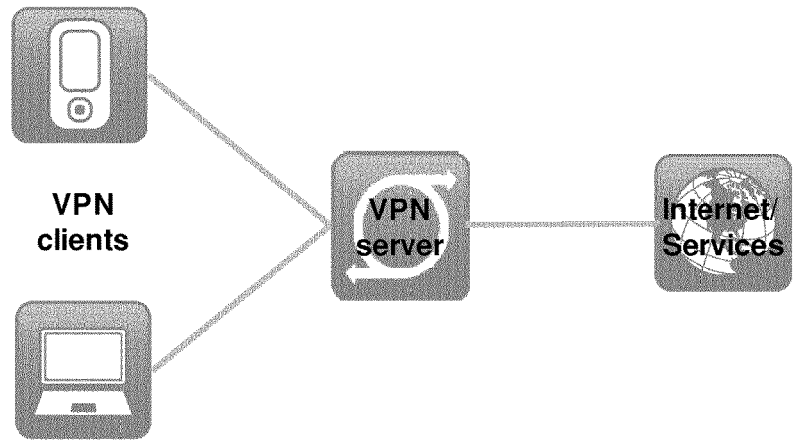
FIG. 1 shows an exemplary system to which embodiments of the invention may be applied.
Figure 2:
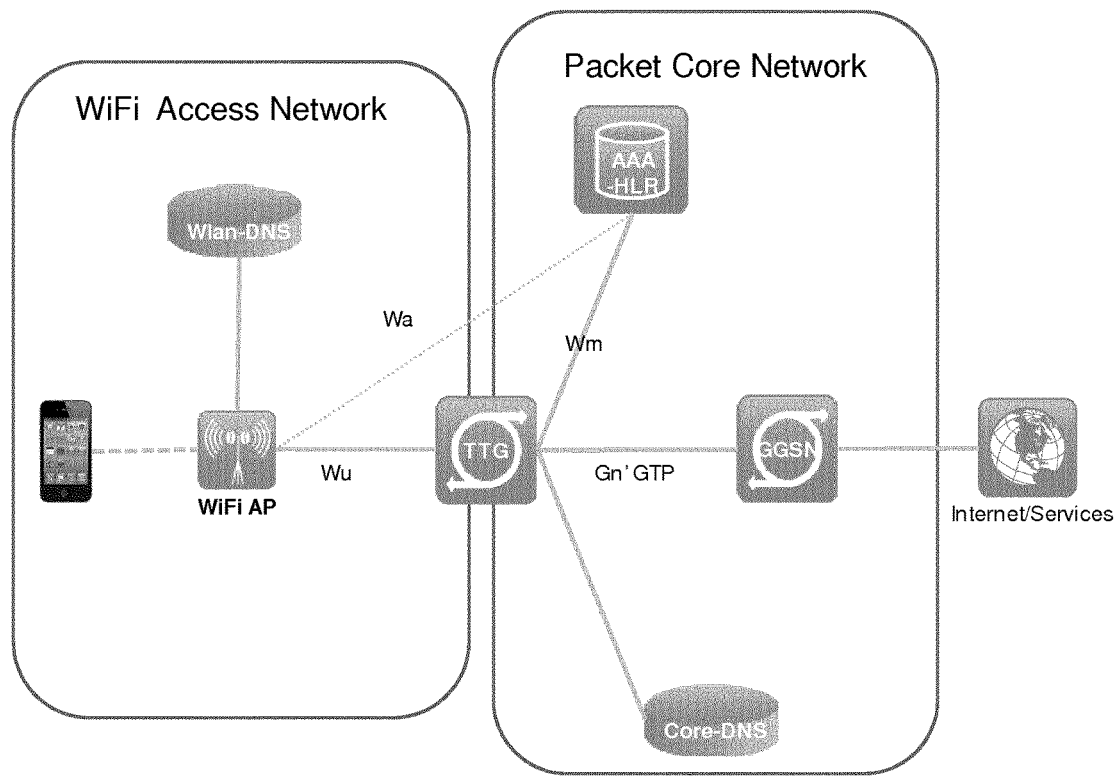
FIG. 2 shows an exemplary architecture of a WLAN interworking system to which embodiments of the invention may be applied.
Figure 3:
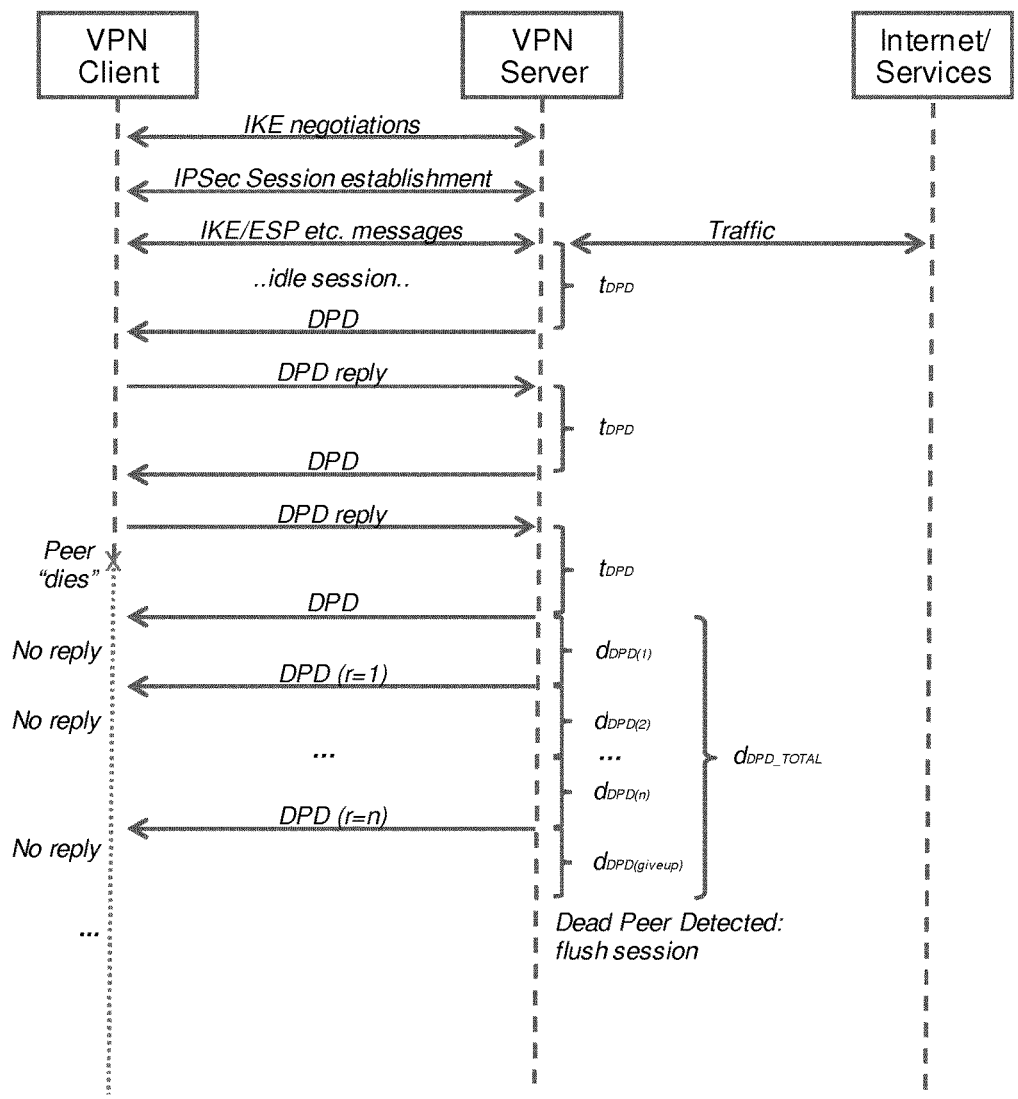
FIG. 3 shows a typical message flow for Dead Peer Detection according to the prior art.
Figure 4:
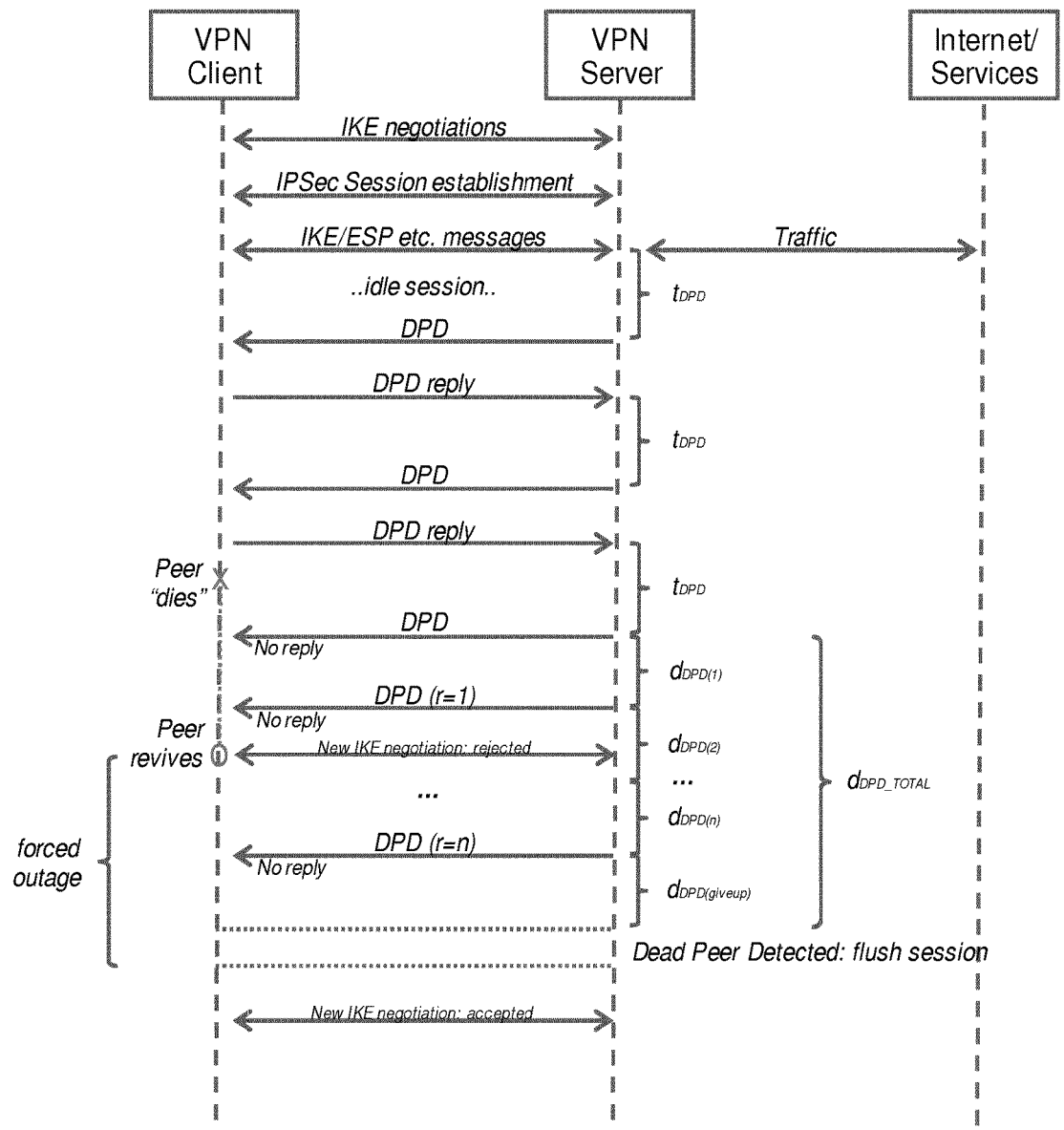
FIG. 4 illustrates the problem of "forced outage" in the case when VPN Server does not allow multiple sessions per IDi, as according to the prior art.
Figure 5:
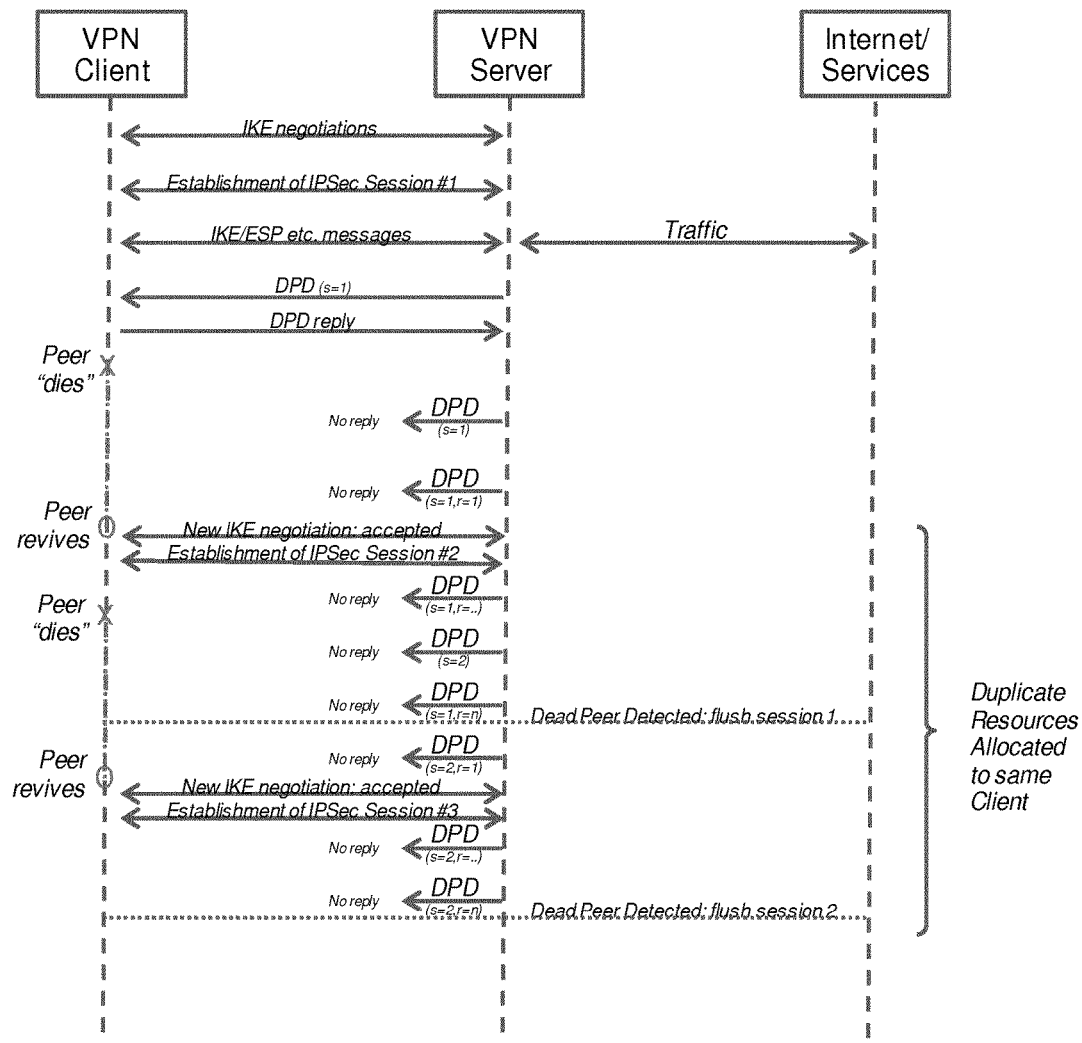
FIG. 5 illustrates the problem of resource wasting in the case when VPN Server allows multiple sessions per IDi, as according to the prior art.
Figure 6:
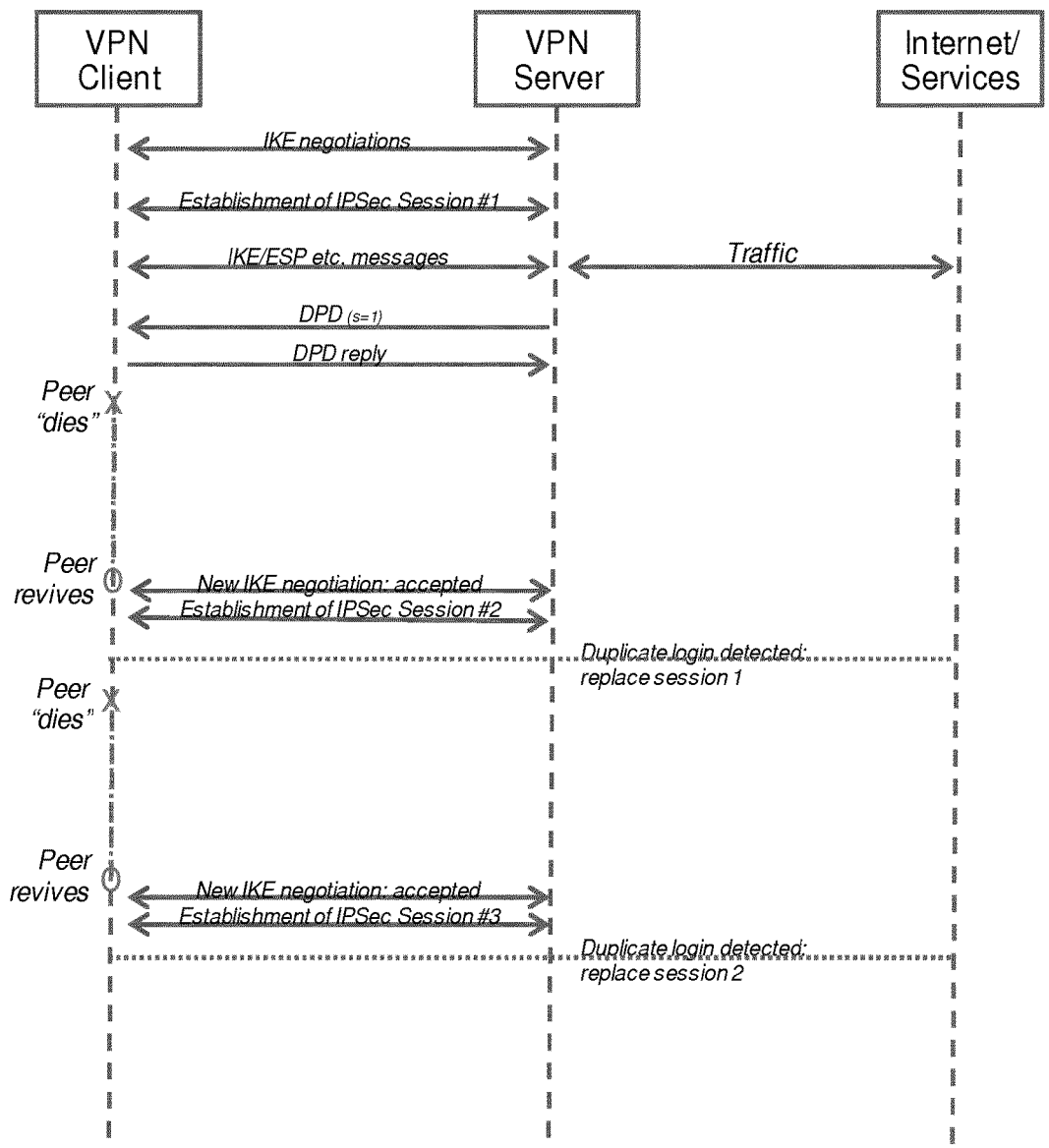
FIG. 6 shows VPN server enforced session replacement according to the prior art.

Embodiments of the invention may be applied to any system which deploys a virtual private network such as IPsec/IKE solutions with dead peer detection extensions (see FIG. 1). For example, embodiments of the invention may be applied to a security gateway element (which may function as VPN server). The VPN client(s) may connect to the VPN server either directly or through other network elements such as Network Address Translation (NAT) elements.

Embodiments of the invention address the "forced outage" problem by implementing a revival detection mechanism. Given an already established session with specific IDi, whenever a new session is requested by an initiator which reuses the same IDi, the end-point (e.g. VPN server) checks whether the initiator is a revived node or a different node attempting a new connection. Thus it is possible for the end-point to differentiate between new peers and dead peers whose "death" has not yet been detected and that might have been revived (e.g. revival after experiencing a short outage).

A revival detection mechanism is absent from the prior art.

By detecting peer revival, embodiments of the invention speed-up the session recovery mechanism of revived peers, which reduces the "forced outage" period experienced by users. This would in turn further reduce the signaling load to the system since the period where users manually reattempt to connect but are blocked, is eliminated or reduced.

Figure 7:
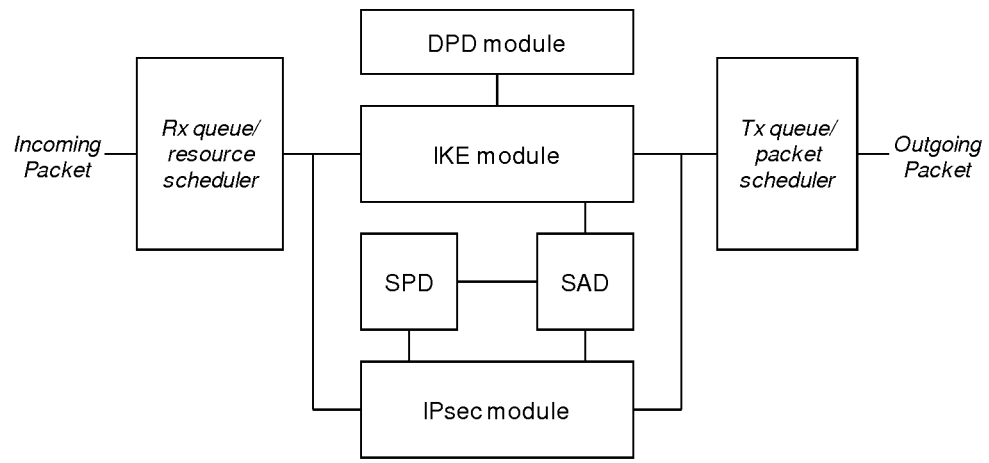
FIG. 7 shows a typical VPN server architecture as used in the prior art.

FIG. 7 depicts a typical packet processing architecture for a VPN Server as used in the prior art. The architecture consists of the following components:

Rx queue/resource scheduler: This component buffers all incoming packets which arrive either from the peer or the services/internet side (see FIG. 1), does some initial header decoding and forwards each packet to the relevant internal resource such as the IKE or the IPsec module for further processing.

IKE module: This component handles all phases of the IKE protocols as described in the relative RFCs.

IPsec module: This component implements the tunnelling functionality as described in the relative RFCs.

SPD (Security Policy Database): This is an internal database component used for policy management such as traffic selection.

SAD (Security Association Database): This is a internal database component which holds Security Association information (destination IP address, SPI etc.).

DPD module: This component is used to detect the "liveliness" of peers by using DPD mechanisms as described in the previous sections and the relative RFCs.

Tx queue/packet scheduler: This component functions as an output buffer for processed packets and forwards each processed packet to the network.

Figure 8:
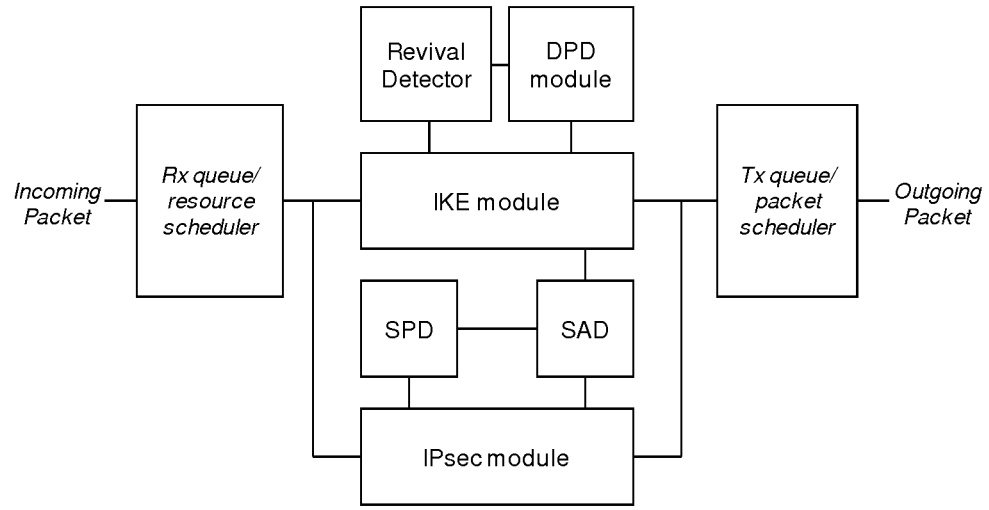
FIG. 8 shows a VPN server architecture according to some embodiments of the invention.

FIG. 8 illustrates an architecture for a VPN server according to some embodiments of the invention. Compared to the prior art architecture, a Revival Detector module is inserted which communicates with the IKE and the DPD modules and is responsible for detecting reviving peers.

The revival detector operates as follows: A new packet scheduled for the IKE module which includes a new VPN session request is first checked against the SAD component for already established sessions from the same IDi. If the IKE module detects that this new request contains the same IDi as one or more already established sessions, then it forwards the information to the Revival Detector. The Revival Detector then detects whether this is a revived peer or not.

According to some embodiments of the invention, the Revival Detector is implemented as follows: The Revival Detector triggers the DPD module using preconfigured values for the DPD parameters in order to quickly determine whether the already established sessions are "dead" or not (boosted DPD procedure). Preconfigured values can be chosen by the Revival Detector to ensure a fast DPD procedure (ensuring a minimal total DPD time $d_{DPD\_TOTAL}$) which would minimize the "forced outage" period and associated signaling loads as described in the previous sections.

Note that standard DPD procedures are in fact "dead session detection" or rather "session liveliness detection" because they are related to a specific session of the peer. For example, in the DPD procedure of RFC 3706, the session related SPI is included in the "Are you there?" notification.

The following paragraphs provide example flow diagrams which further illustrate the differences between embodiments of the invention and the prior art, for both cases of single session per IDi and multiple sessions per IDi.

Case: Single Session Per IDi

Figure 9:
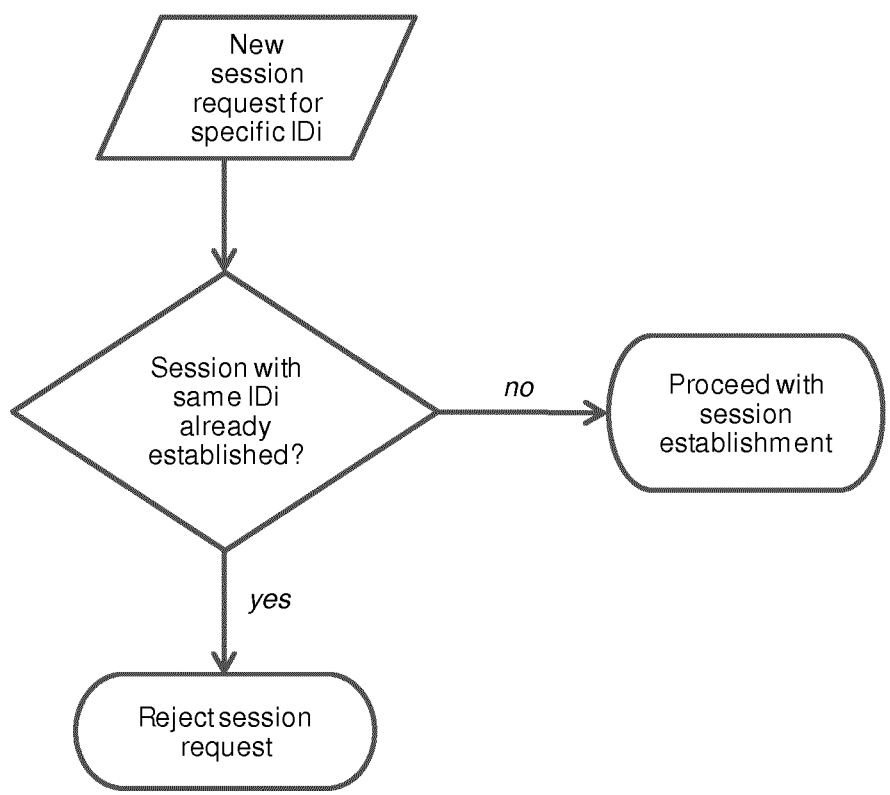
FIG. 9 shows a method of handling a session request if a single session per IDi is allowed, as according to the prior art.

FIG. 9 presents a flow diagram which describes the overall operation of the server architecture as found in prior art (see FIG. 7) for the case of single session per IDi. Whenever a new session is requested with given IDi, the server checks whether another session with the same IDi exists in the database (SAD). If not, then session is established normally. If another session with same IDi already exists, then the new session establishment is rejected.

The last outcome in FIG. 9, namely session rejection, is responsible for the "forced outage" effect, as described in the previous sections.

Figure 10:
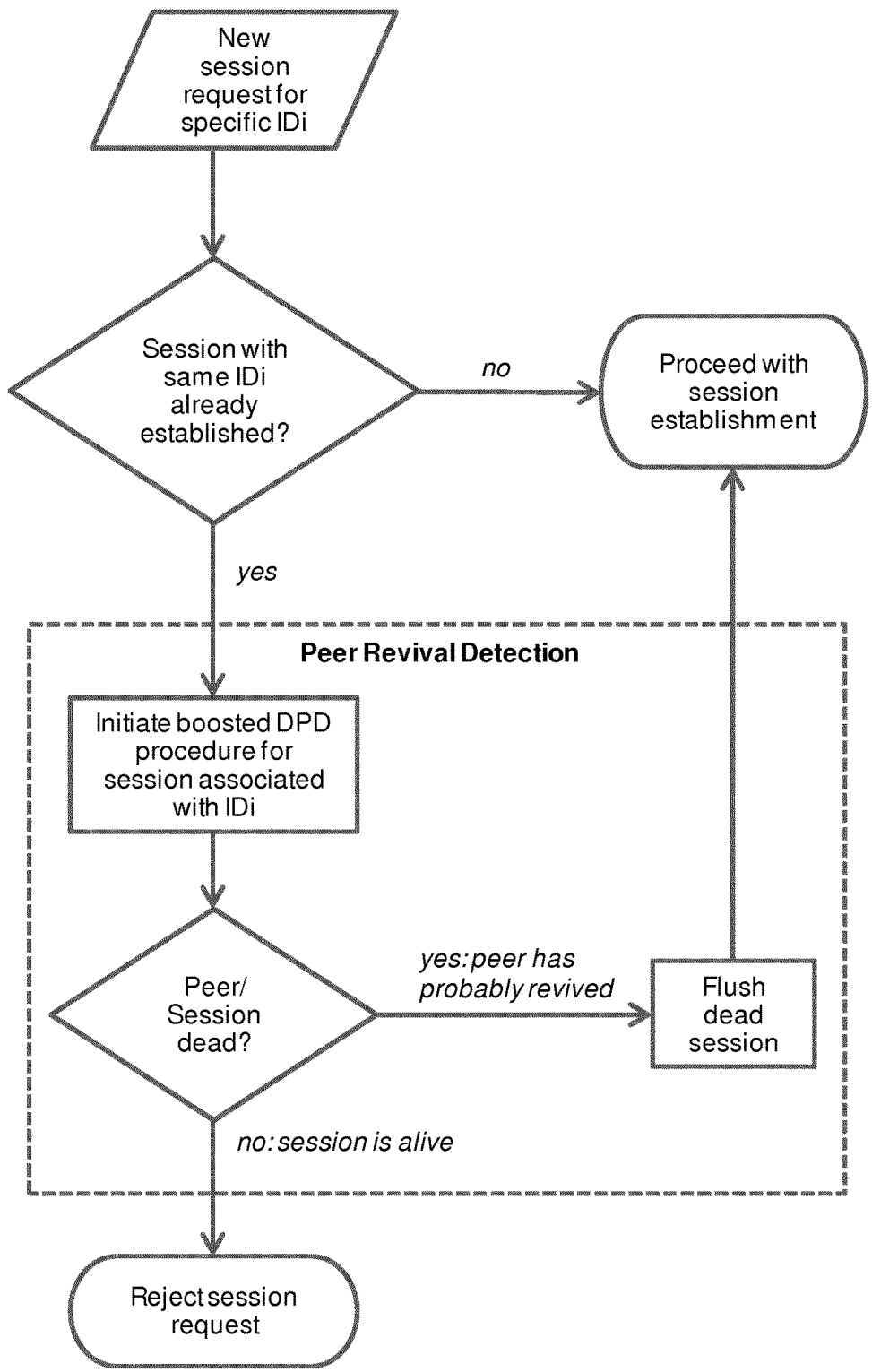
FIG. 10 shows a method of handling a session request with peer revival detection if a single session per IDi is allowed, as according to some embodiments of the invention.

FIG. 10 illustrates how Peer Revival Detection according to embodiments of the invention (see FIG. 8 for the architectural overview) is introduced in the server flow diagram. Whenever a new session is requested with given IDi, the server checks whether another session with the same IDi exists in the database (SAD). If not, then session is established normally. If another session with same IDi already exists, then instead of directly rejecting the new session establishment, as performed by prior art, the Peer Revival Detection mechanism is initiated.

In these embodiments, during Peer Revival Detection, a boosted DPD procedure for the session associated with the specific IDi may be initiated where the DPD parameters are chosen such that the DPD completes much faster than the normal DPD procedure. For example, in the boosted DPD procedure, parameters c, b, n (see section 2) may be chosen such that $d_{DPD\_TOTAL(DPDboost)}$ is significantly lower than the normal $d_{DPD\_TOTAL}$ interval.

While Peer Revival Detection introduces a delay of $d_{DPD\_TOTAL(DPDboost)}$ in the session establishment procedure, this delay will not significantly affect the session establishment procedure since, according to [RFC5996: Section 2.4], the session establishment procedure can be delayed by a period of several minutes depending on the application scenario.

Once the boosted DPD procedure is completed, it is concluded whether the previous session with associated IDi is dead. If yes, then this session request is probably from a peer who has experienced an outage and has revived, and thus the previous dead session is flushed and the new session is established. If the previous session with associated IDi is alive, then the new request is from a second peer or a request for a second session from the same peer, and thus the new session request is rejected.

As can be seen from FIGS. 9 and 10, the Peer Revival Detection mechanism is a failsafe mechanism introduced before session rejection which functions as a revival detector. This mechanism achieves a reduction in the "forced outage" period experienced by users in the network and further reduces the signalling load to the system, since the period where users manually reattempt to connect after new session rejection but are again rejected, is eliminated or shortened.

Case: Multiple Sessions Per IDi

Figure 11:
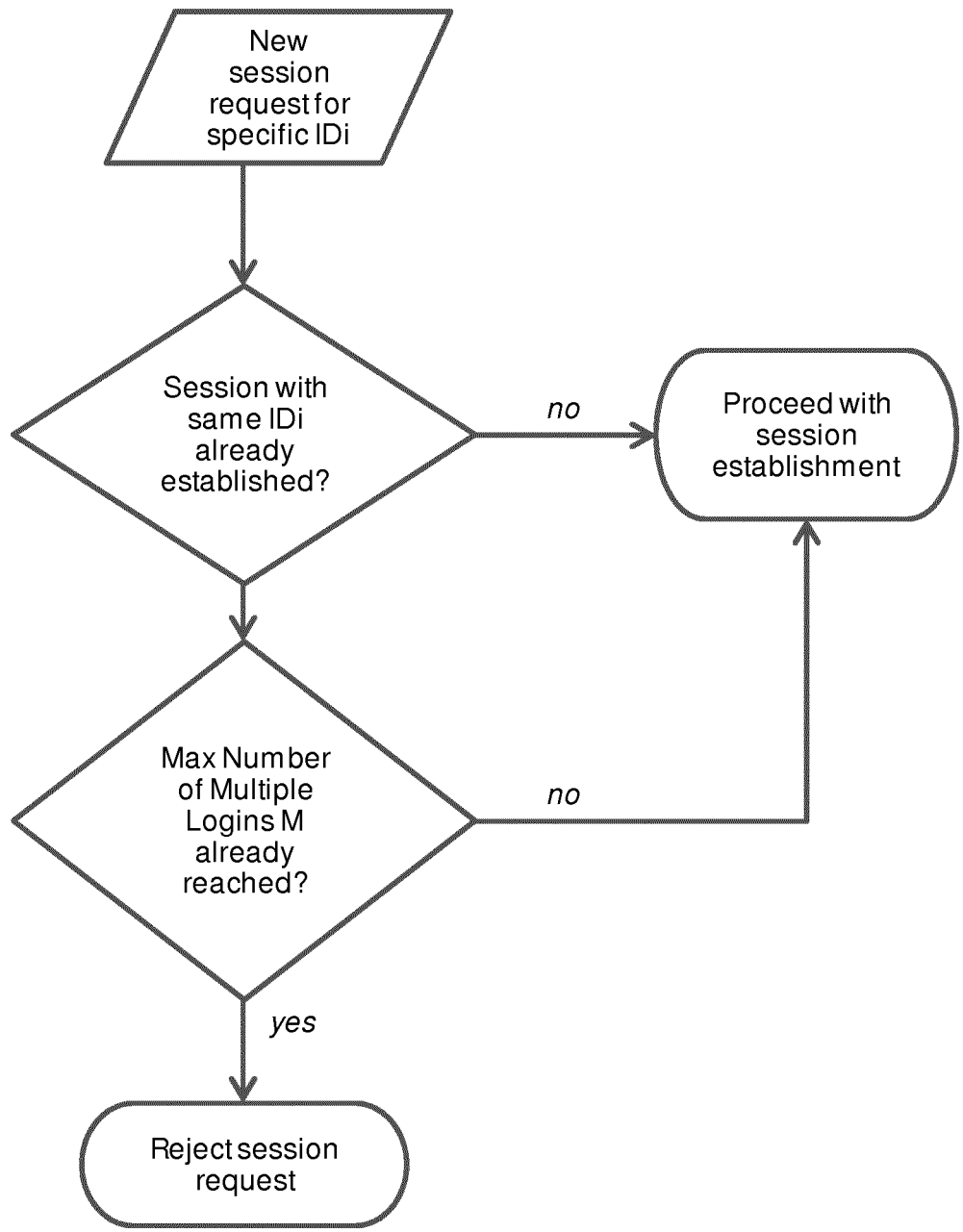
FIG. 11 shows a method of handling a session request if multiple sessions per IDi are allowed, as according to the prior art.

FIG. 11 presents a flow diagram which describes the overall operation of the server architecture as found in prior art (see FIG. 7) for the case of multiple sessions per IDi. Whenever a new session is requested with given IDi, the server checks whether another session with the same IDi exists in the database (SAD). If not, then session is established normally. If another session with same IDi already exists, then the server checks whether all the multiple session slots M are currently occupied by sessions. If no, then the requested session is established, otherwise the new session establishment is rejected.

Once again, the last outcome in FIG. 11, namely session rejection, is responsible for the "forced outage" effect, as described in the previous sections. Moreover, in the case where a mobile node comes frequently into and out of outage as in the case of practical systems, operation according to the prior art flow diagram would allocate duplicate resources to the same client, thus wasting resources, as described in the background section.

Figure 12:
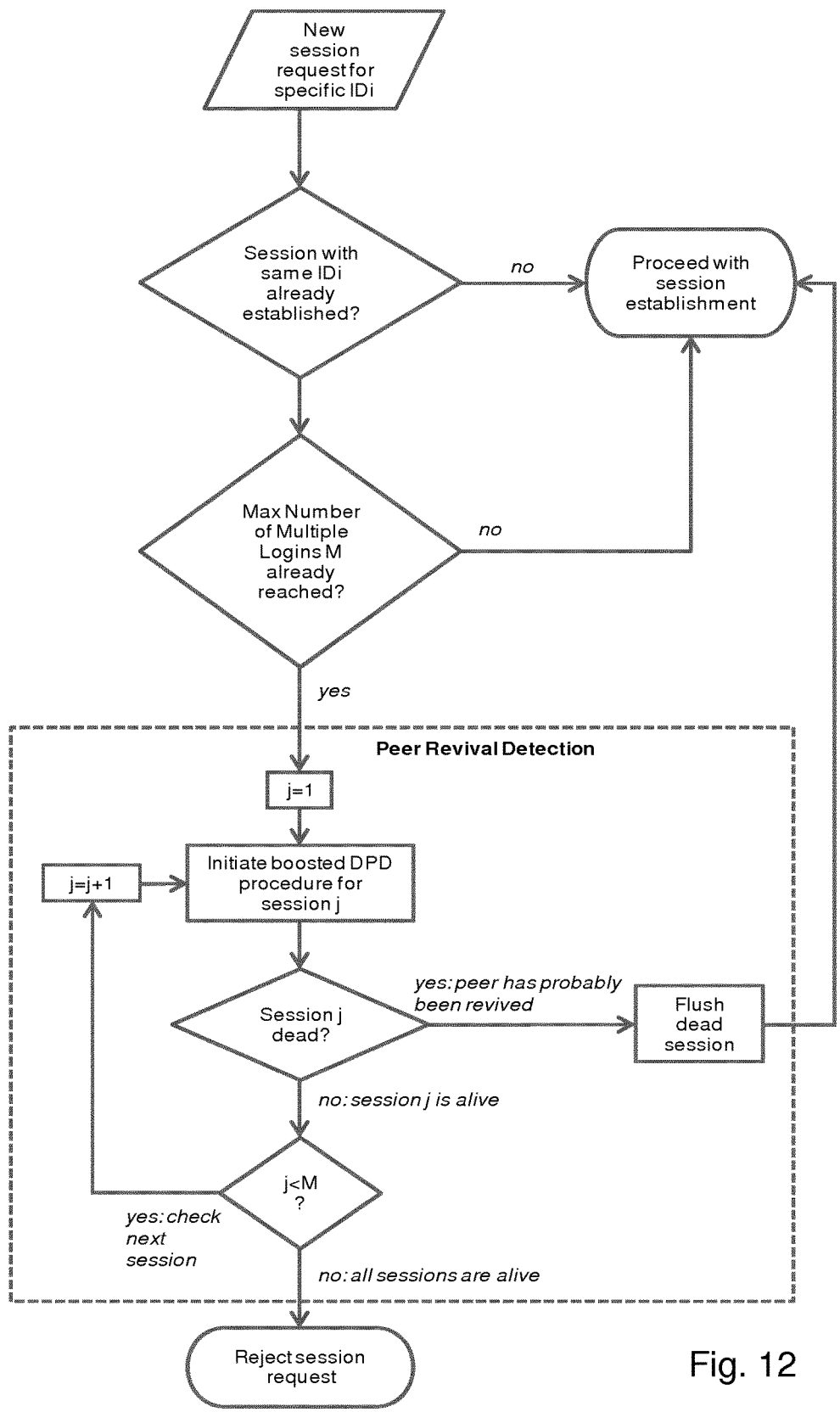
FIG. 12 shows a method of handling a session request with peer revival detection if multiple sessions per IDi are allowed, as according to some embodiments of the invention.

FIG. 12 illustrates how Peer Revival Detection according to embodiments of the invention (see FIG. 8 for the architectural overview) can be deployed in the flow diagram in systems where multiple sessions per IDi are allowed. Whenever a new session is requested with given IDi, the server checks whether another session with the same IDi exists in the database (SAD). If not, then session is established normally. If another session with same IDi already exists, then the number of current simultaneous sessions for IDi is checked for whether it has already reached the maximum number of multiple sessions M per IDi. If not, then the new session request proceeds. Otherwise, if the maximum number of simultaneous sessions per IDi has already been reached, then, instead of directly rejecting the new session establishment as performed by prior art, the Peer Revival Detection mechanism is initiated.

During the Peer Revival Detection, all M sessions may be checked for liveliness (loop with iterator j in FIG. 12), similar to the single session case described above. In some embodiments, a boosted DPD procedure may be used.

Potentially, the total delay for the Peer Revival Detection in the multiple sessions case might be higher than the delay of Peer Revival Detection in the single session case depending on the specific design of the loop. Nevertheless, this delay may not significantly affect the session establishment procedure since, according to [RFC5996: Section 2.4], the session establishment procedure can be delayed by a period of several minutes depending on the application scenario.

Once a session has been found to be dead by the boosted DPD procedure, then the peer is assumed to be a revived peer; in that case the dead session is flushed from the database and the new session request proceeds.

It should be noted that FIG. 12 shows merely an exemplary embodiment. For example, any fixed or dynamic algorithm may be used for DPD. For example, Peer Revival Detection can be triggered at any stage of the flow diagram which would aid in more efficiently managing resources. For example, Peer Revival Detection may be performed after it was determined that a session with the same Idi is already established but before it is checked whether the maximum number of sessions is reached. Thus, it is avoided that unnecessary dead sessions are maintained.

In addition, depending on the application scenario, the loop in FIG. 12 may either prematurely end once a dead session has been found, or it may continue by checking the liveliness of the rest of the sessions according to any designed scheduling mechanism, which would aid in more properly managing resource consumption.

The checking of the sessions may be performed sequentially or (at least partly) in parallel. Even if according to some embodiments of the invention several checks are made in parallel, ongoing checks may be ceased if a dead session is found.

As another example, the loop for boosted DPD checks may be non serial such that multiple DPD mechanisms may be operated in parallel. Thus, the procedure according to any application scenario may be optimized and/or the total delay of Peer Revival Detection may be minimized.

Figure 13:
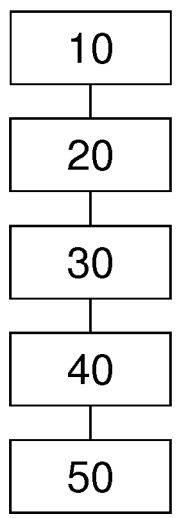
FIG. 13 shows an apparatus according to an embodiment of the invention.
Figure 14:
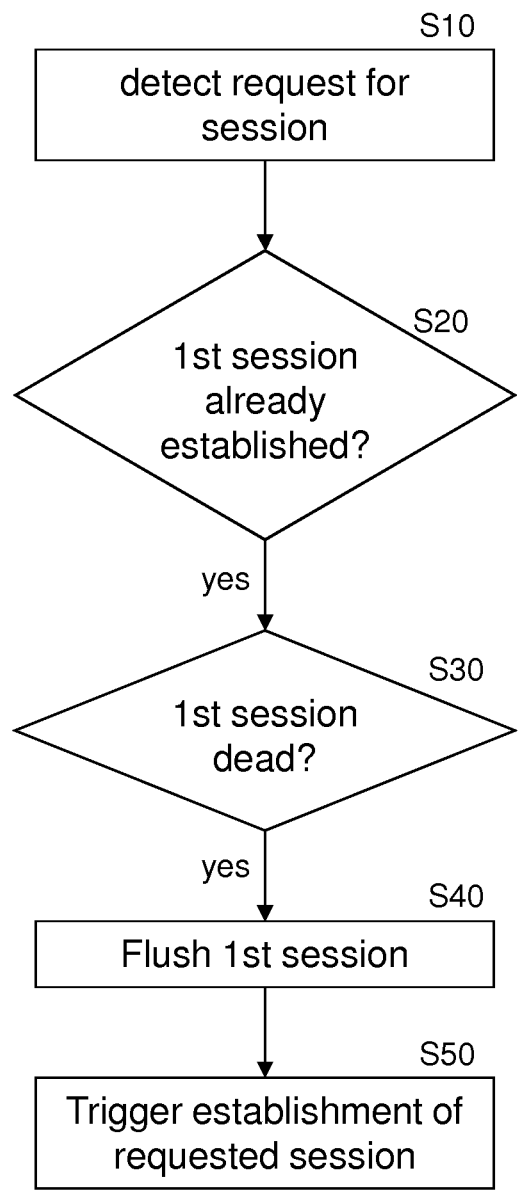
FIG. 14 shows a method according to an embodiment of the invention.

FIG. 13 shows an apparatus according to an embodiment of the invention. The apparatus may be a VPN server. FIG. 14 shows a method according to an embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises detecting means 10, checking means 20, determining means 30, flushing means 40, and triggering means 50.

The detecting means 10 detects a request for establishing a session between a peer and a network, wherein the request is received from the peer (S10). The request comprises an identifier of a user of the network.

The checking means 20 checks, if the request is detected, whether a first session is established (S20). The first session is a session of the user to which the identifier of the received request belongs. Furthermore, the first session is established between the peer and the network, as would be the requested session.

The determining means 30 determines whether the first session is dead or alive (S30). This determination takes place if it is positively checked that the first session is established.

If it is determined that the first session is dead, the flushing means 40 flushes the first session (S40) and the triggering means 50 triggers an establishment of the requested session (S50), i.e. the session requested in step S10. The sequence of these steps may be interchanged or these steps may be performed in parallel.

In general, embodiments of the invention apply to both of hub and spoke VPN topologies, wherein e.g. a VPN server acts as a hub and numerous peers/users act as spokes which are connected to the hub.

Embodiments of the invention may also be deployed to any network which deploys procedures to monitor the "liveliness" of nodes, such as SIP systems (e.g. [Lee07] and references therein), routing protocols, applications using TCP which require "liveliness" monitoring (see e.g. [RFC1122: Section 4.2.3.6]) or services such as Social Networking Service (SNS) ([Hyeon12] and references therein). Furthermore, embodiments of the invention may be applied straightforwardly to any control system which aims to optimize the memory and CPU load of network elements (such as the techniques for web server optimization described in [Diao02] and references therein).

Moreover, embodiments of the invention may be straightforwardly extended applied to systems where multiple VPN servers are used which implement high availability features (e.g. master/slave configurations) or load balancing configurations and to systems where the mobile terminals have multiple wireless or wired connections to the access network where the terminals either do not or do implement paging functions to any or all of the connections.

Moreover, embodiments of the invention may also apply to UMTS, LTE, GSM and HSxPA and systems and evolved PDG (ePDG) elements.

Embodiments of the invention apply to any negotiation messages such as IKE negotiations and protocols as well as any secure session establishment methods. In some embodiments, instead of the term "session" the term "login" or other corresponding terms may be used.

A terminal may comprise any kind of terminal that may be peered to the other node such as a user equipment, mobile phone, PDA, laptop, smartphone, personal computer etc.

If not otherwise stated or otherwise made clear from the context, the statement that two entities are different means that they are differently addressed in the core network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a network node such as a hub or a VPN server, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor; and
at least one memory including computer program code,
wherein the at least one memory and the computer program code are configured to, with the at least one processor, cause the apparatus at least to:
detect a request for establishing a session between a peer and a network, wherein the request is received from the peer and comprises an identifier of a user of the network;
check whether the request is detected, wherein when the request is detected, the at least one memory and the computer program code are configured to, with the at least one processor, cause the apparatus at least to check whether a first session is established, wherein the first session is a session of the user which is established between the peer and the network; and
determine whether it is checked that the first session is established,
wherein when it is checked that the first session is established, the at least one memory and the computer program code are configured to, with the at least one processor, cause the apparatus at least to determine whether the first session is dead or alive, and
wherein when it is determined that the first session is dead, the at least one memory and the computer program code are configured to, with the at least one processor, cause the apparatus at least to
flush the first session; and
trigger an establishment of the requested session.

2. The apparatus according to claim 1, wherein the at least one memory and the computer program code are further configured to, with the at least one processor, cause the apparatus at least to:
count a number of established sessions of the user to the network; and
inhibit the determination of whether the first session is dead or alive if the number of the established sessions of the user is less than a maximum number.

3. The apparatus according to claim 2, wherein the maximum number is 1.

4. The apparatus according to claim 2, wherein the maximum number is larger than 1, and wherein the at least one memory and the computer program code are further configured to, with the at least one processor, cause the apparatus at least to
determine for at least one of all the established sessions of the user to the network, whether the respective session is dead or alive; and
flush at least one session of the user which is determined being dead.

5. The apparatus according to claim 4, wherein the at least one memory and the computer program code are further configured to, with the at least one processor, cause the apparatus at least to determine for all of the established sessions of the user to the network, whether the respective session is dead or alive.

6. The apparatus according to claim 4, wherein the at least one memory and the computer program code are further configured to, with the at least one processor, cause the apparatus at least to flush each session of the user which is determined being dead.

7. The apparatus according to claim 4, wherein the at least one memory and the computer program code are further configured to, with the at least one processor, cause the apparatus at least to:
determine for at least two of all the established sessions of the user to the network whether the respective session is dead or alive; and
prohibit, after determining that one of all the established sessions is dead, determining whether any of all the established sessions of the user is dead or alive for which it has not been determined before it was determined for the one of all the established sessions.

8. The apparatus according to claim 1, wherein the at least one memory and the computer program code are further configured to, with the at least one processor, cause the apparatus at least to:
perform a normal session liveliness detection if a transmission from the peer in the first session is not received in order to determine whether the first session is dead or alive; and
determine whether the first session is dead or alive by a boosted session liveliness detection faster than the normal session liveliness detection.

9. The apparatus according to claim 1, wherein the network is a virtual private network.

10. A method, comprising
detecting a request for establishing a session between a peer and a network, wherein the request is received from the peer and comprises an identifier of a user of the network;
checking, upon detection of the request, whether a first session is established, wherein the first session is a session of the user which is established between the peer and the network;
determining, upon checking that the first session is established, whether the first session is dead or alive;
wherein if it is determined that the first session is dead, the method further comprises:
flushing the first session; and
triggering an establishment of the requested session.

11. The method according to claim 10, further comprising
counting a number of established sessions of the user to the network;
inhibiting the determining whether the first session is dead or alive if the number of the established sessions of the user is less than a maximum number.

12. The method according to claim 11, wherein the maximum number is 1.

13. The method according to claim 11, wherein the maximum number is larger than 1, and wherein
the determining is adapted to determine for at least one of all the established sessions of the user to the network whether the respective session is dead or alive;
the flushing is adapted to flush at least one session of the user which is determined being dead.

14. The method according to claim 13, wherein
the determining is adapted to determine for all of the established sessions of the user to the network whether the respective session is dead or alive.

15. The method according to claim 14, wherein
the flushing is adapted to flush each session of the user which is determined being dead.

16. The method according to claim 14, wherein
the determining is adapted to determine for at least two of all the established sessions of the user to the network whether the respective session is dead or alive; and
the method further comprises
prohibiting, after it is determined that one of all the established sessions is dead, the determining whether any of all the established sessions of the user is dead or alive for which it has not been determined before it was determined for the one of all the established sessions.

17. The method according to claim 10, further comprising
performing a normal session liveliness detection if a transmission from the peer in the first session is not received in order to determine whether the first session is dead or alive; wherein
the determining is adapted to determine whether the first session is dead or alive by a boosted session liveliness detection faster than the normal session liveliness detection.

18. The method according to claim 10, wherein the network is a virtual private network.

19. A computer program product embodied on a non-transitory computer-readable medium, said product comprising a set of instructions which, when executed on an apparatus, is configured to cause the apparatus to carry out the method according to claim 10.

* * * * *